Patented Jan. 20, 1931

1,789,311

UNITED STATES PATENT OFFICE

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE

ZIRCONIUM OPACIFIER AND METHOD OF MAKING SAME

No Drawing. Application filed September 7, 1928. Serial No. 304,619.

My invention relates more particularly to improved methods of producing enamels and glazing glasses in which zirconium is used as an opacifier, and such product is introduced into the ingredients of the enamel mix for producing the frit subsequently employed for the coating in the finally vitrified enamel products.

The objects of my invention are, among other things, to produce a new and improved opacifier comprising zirconium in which the opacity contributed by the zirconium may be better controlled and utilized than by previous methods now known. Heretofore in producing enamel glasses the zirconium compounds in the form of zirconium oxide, zircon or zirconium silicate and various double zirconium silicates, have been incorporated in the batch and smelted in the usual way to produce fluid enamels.

Broadly speaking, I have discovered a new zirconium product and methods of making same in which sodium zirconium silicate is used to produce opacity in vitreous enameling glasses, more particularly those enamels which when smelted will be sufficiently fluid to pour at temperatures below 1100° C. I have also discovered that such sodium zirconium silicate will produce far greater opacity than with the use of unaltered zirconium silicate at the temperatures mentioned.

My experiments have shown that sodium zirconium silicate when incorporated into a suitable enamel batch composition and smelted at a temperature around 1080° C. yielded a glass which when prepared to slip for enameled ware produced enamels vastly more opaque than did the same enamel composition containing zirconium silicate.

The difference in opacity between the two enamel coatings of equal weight per unit area was such that a much smaller quantity of the enamel slip made from the glass containing the zirconium introduced as sodium zirconium silicate was required to produce enamels of equal opacity. For example, instead of applying say 50 grams of enamel per square foot of surface to produce suitable enameled ware when using a slip containing glass made from zirconium silicate, enameled ware of equivalent opacity and whiteness may be prepared by applying less than 35 grams of enamel made from glass containing sodium zirconium silicate. Such definite advantages not only work economies in use of materials and in lowering of enameling costs, but also and more importantly result in the use of thinner enamel coatings; this latter advantage in turn results in less defective ware because it is generally recognized in the enameling art that the thinner the coating the better the adhering properties of the enamel on its base.

I have also discovered that in enamels requiring a smelting temperature higher than 1100° C., the exceptional benefits arising from the use of sodium zirconium silicate are largely, if not wholly, lost, and that no practical advantages by way of opacity and coloring effects are derived from using sodium zirconium silicate as compared with zirconium silicate at such high temperatures.

According to my invention, I have ascertained from prolonged experimentation that for enamels which can be smelted at temperatures below 1100° C., or for enamels fluid enough to pour at temperatures below 1100° C., sodium zirconium silicate produces a more intense opacity than does zirconium silicate.

Such novel product may be prepared in the following preferred manner:

Zirconium silicate is wet milled to a degree of fineness represented by all passing a 325 mesh standard testing sieve. The zirconium silicate is then dried to essentially complete expulsion of contained water.

The dried zirconium silicate mass is then broken up roughly and mixed with soda ash (sodium carbonate) in the following proportions:

Milled zirconium silicate_ 78 parts by weight
Soda ash_____ 22 parts by weight

A mixing is effected and then the charge is disintegrated in a suitable machine which not only mixes but also disintegrates the dried zircon and soda ash aggregates to such a fineness that less than 0.10% will remain on a 200 mesh sieve.

The thoroughly blended and finely disintegrated mass is now charged into a suitable furnace the active heating chamber of which has been heated to a temperature of about 900–950° C. The charge is brought to a temperature of about 925° C. at which point a rapid combination of the soda ash and zirconium silicate takes place and when this reaction has proceeded to a point where practically all the soda ash has combined with the zircon, though leaving a substantial amount of the zircon undecomposed, the charge is withdrawn and cooled.

The charge during all stages of reaction is apparently completely dry (not sintered), and as finished the product is only slightly aggregated and needs only a mild degree of disintegration to put in form for packing and use.

The temperatures specified produce a product of good color tone. Higher temperatures result in development of yellowish to greyish tones which are undesirable mainly on account of the tone being not pleasing to the eye. There has been found no detrimental effect upon the color of resultant enamel glass or finished enamel, due to use of such overheated and discolored products. I prefer to use the temperature which gives a fairly rapid reaction and lightest tone to product avoiding higher temperatures than are necessary to accomplishment of these ends.

Having found that the normal sodium zirconium silicate produced by roasting a mixture of milled zirconium silicate and soda ash at temperatures of about 900–950° C., I found also that this product when dry disintegrated and stored for use in packages other than air tight containers, had a tendency to cake or harden so that subsequent disintegration was necessary before same could be used in enamel batches. Such hardening was a decided defect as regards the successful use of such product. I discovered that such caking or hardening was always accompanied by absorption of moisture and that when the product had absorbed about 2% of moisture no further caking followed. Hence if the freshly roasted mass (sodium zirconium silicate) was kept in a state of slow agitation while air charged with moisture was passed through or over the mass in motion until about 2% of moisture was absorbed, no tendency to cake developed in the product when packed in bags or barrels and this opacifier remained permanently soft; also if such roasted mass was extracted with water and dried the resulting product could be disintegrated and the powdered opacifier stored permanently without any undesirable caking.

However I preferred not to resort to either of these expedients, and I further discovered that a satisfactory non-caking zirconium opacifier could be made according to the methods hereinbefore described where less than the theoretical quantity of soda ash (sodium carbonate) required to form a normal sodium zirconium silicate was employed for the charge to be roasted, which leaves a part of the zirconium silicate undecomposed.

As a result of my experiments I have discovered that an improved zirconium opacifier having the following composition was as effective in producing opacity in enamels which can be smelted and poured at temperatures below 1100° C., as the normal sodium zirconium silicate, and furthermore such new product did not harden or cake upon storage.

My new product was chemically analyzed as follows:—

| | |
|---|---|
| Zirconium oxide ($ZrO_2$) | 54.78% |
| Silica ($SiO_2$) | 28.22% |
| Sodium oxide ($Na_2O$) | 14.17% |
| Titanic oxide ($TiO_2$) | 0.12% |
| Iron oxide ($Fe_2O_3$) | 0.08% |
| Aluminum oxide ($Al_2O_3$) | 1.11% |
| Phosphoric anhydride ($P_2O_5$) | 0.59% |
| Carbon dioxide ($CO_2$) | 0.44% |
| Moisture ($H_2O$) | 0.49% |

The aluminum oxide, phosphoric anhydride, iron and titanium oxides are incidental impurities, while the carbon dioxide represents that contained in the small amount of uncombined sodium carbonate.

In addition to the non-caking advantages hereinbefore described, such product has the further advantage over the normal sodium zirconium silicate in building up the enamel batch, since more of the required boric anhydride ($B_2O_3$) may be supplied as borax ($Na_2B_4O_7$) than was possible with the normal sodium zirconium silicate because of the lower sodium content.

In enamel mix formulæ using my improved zirconium opacifier all or substantially all of the necessary boric anhydride ($B_2O_3$) can be supplied as borax, whereas with normal sodium zirconium silicate, practically all the $B_2O_3$ was supplied as boric acid which compound is an expensive source of $B_2O_3$. Hence a marked saving in glass costs is secured by utilizing my new product wherein less than the theoretical quantity of sodium carbonate required to form a normal sodium zirconium silicate is used in preparing the improved zirconium opacifying product.

I claim as my invention:—

1. A roasted zirconium opacifier for enamels fluid at temperatures below 1100° C. derived from mixture of zirconium silicate and sodium carbonate having approximately the following composition by weight: zirconium oxide 4 parts, silica 2 parts and sodium oxide 1 part.

2. The method of making zirconium opacifiers for vitreous enamels containing sodium zirconium silicate and zirconium silicate which comprises heating a mixture of zirconium silicate, about 78 parts by weight, and sodium carbonate, about 22 parts by weight, to about 900-950° C., and cooling and disintegrating the resulting mass.

3. The method of making zirconium opacifiers for vitreous enamels containing sodium zirconium silicate and zirconium silicate which comprises heating a mixture of zirconium silicate, about 78 parts by weight, and sodium carbonate, about 22 parts by weight, until substantially all of the sodium carbonate has combined with the zirconium silicate.

4. A zirconium opacifier for vitreous enameling glasses smelted at temperatures below 1100° C. consisting of a roasted product containing normal sodium zirconium silicate approximately 55% and undecomposed zirconium silicate about 45%.

5. A zirconium opacifier consisting of a roasted product containing approximately by analysis the following constituents: zirconium oxide, 55%; silica 28%; sodium oxide, 14%, with traces of oxides of iron, titanium, aluminum and phosphorus; also traces of carbon dioxide and water.

CHARLES J. KINZIE.